(12) United States Patent
Kvaldén et al.

(10) Patent No.: US 12,070,996 B2
(45) Date of Patent: Aug. 27, 2024

(54) BATTERY BOX ARRANGEMENT

(71) Applicant: Scania CV AB, Södertälje (SE)

(72) Inventors: Daniel Kvaldén, Mariefred (SE); Julian Stemp, Tullinge (SE); Erik Lock Andersson, Stockholm (SE); Anders Johansson, Älvsjö (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 17/773,170

(22) PCT Filed: Oct. 15, 2020

(86) PCT No.: PCT/SE2020/050981
§ 371 (c)(1),
(2) Date: Apr. 29, 2022

(87) PCT Pub. No.: WO2021/091448
PCT Pub. Date: May 14, 2021

(65) Prior Publication Data
US 2024/0149654 A1 May 9, 2024

(30) Foreign Application Priority Data

Nov. 6, 2019 (SE) .................................. 1951270-6

(51) Int. Cl.
*B60K 1/04* (2019.01)
*B60K 15/063* (2006.01)
(Continued)

(52) U.S. Cl.
CPC .............. *B60K 1/04* (2013.01); *B60K 15/063* (2013.01); *B60L 50/66* (2019.02);
(Continued)

(58) Field of Classification Search
CPC ............. H01M 50/249; H01M 50/242; H01M 2220/20; B60K 2015/0634;
(Continued)

(56) References Cited

U.S. PATENT DOCUMENTS 5,585,205 A * 12/1996 Kohchi ............... H01M 50/209
180/68.5
7,270,208 B2 * 9/2007 Huang .................... B60R 16/04
180/68.5
(Continued)

FOREIGN PATENT DOCUMENTS

| CN | 106299188 A | 1/2017 |
| CN | 108674167 A | 10/2018 |

(Continued)

OTHER PUBLICATIONS

Dec. 9, 2020—(WO) International Search Report & Written Opinion—App. No. PCT/SE2020/050981.
(Continued)

*Primary Examiner* — Jason D Shanske
*Assistant Examiner* — James J Triggs
(74) *Attorney, Agent, or Firm* — Banner & Witcoff, Ltd.

(57) ABSTRACT

The invention relates to a battery box arrangement for a vehicle, the arrangement comprising: a battery box configured to comprise at least one electric battery; at least one elongated beam element connected to the battery box; and at least one vibration damping element configured for connecting the at least one elongated beam element to a chassis frame of the vehicle; wherein the at least one elongated beam element is configured to extend transverse to the chassis frame of the vehicle; wherein a first end part of the at least one elongated beam element is connected to a first battery box module of the battery box, and wherein a second end part of the at least one elongated beam element is
(Continued)

connected to a second battery box module of the battery box. The invention also relates to a vehicle with such a battery box arrangement.

13 Claims, 5 Drawing Sheets

(51) Int. Cl.
  *B60L 50/60*   (2019.01)
  *H01M 50/242*  (2021.01)
  *H01M 50/249*  (2021.01)
  *B62D 21/15*   (2006.01)

(52) U.S. Cl.
  CPC ....... *H01M 50/242* (2021.01); *H01M 50/249* (2021.01); *B60K 2001/0438* (2013.01); *B60K 2015/0634* (2013.01); *B62D 21/157* (2013.01); *H01M 2220/20* (2013.01)

(58) Field of Classification Search
  CPC .................. B60K 2001/0438; B60K 15/063; B60K 1/04; B62D 21/157; B60L 50/66
  See application file for complete search history.

(56) References Cited

U.S. PATENT DOCUMENTS

| | | | |
|---|---|---|---|
| 9,630,502 B2* | 4/2017 | Chen | B60L 3/0069 |
| 10,112,471 B2* | 10/2018 | Higuchi | B60L 53/80 |
| 10,493,837 B1* | 12/2019 | Angelo | B60L 50/66 |
| 11,541,738 B2* | 1/2023 | Menon | B60L 50/66 |
| 11,766,925 B2* | 9/2023 | Landvik | H01M 50/204 |
| | | | 180/68.5 |
| 11,845,346 B2* | 12/2023 | Castleman | B62D 29/007 |
| 2017/0320381 A1 | 11/2017 | Milton et al. | |
| 2017/0334279 A1 | 11/2017 | Higuchi et al. | |
| 2022/0169125 A1* | 6/2022 | Borghi | B60L 3/0046 |

FOREIGN PATENT DOCUMENTS

| | | |
|---|---|---|
| CN | 208714935 U | 4/2019 |
| DE | 102013103154 A1 | 10/2013 |
| EP | 1968818 B1 | 12/2011 |
| EP | 1940655 B1 | 12/2013 |
| GB | 2553537 A | 3/2018 |
| JP | 2018118673 A | 8/2018 |
| KR | 19980035495 A | 8/1998 |
| MX | 2019000281 A | 9/2019 |
| WO | 2020074105 A1 | 4/2020 |

OTHER PUBLICATIONS

Jun. 26, 2020—(SE) Office Action—App. No. 1951270-6.
Jun. 26, 2019—(SE) Technology Search Report.
Nov. 21, 2023—(EP) Extended Search Report—App. No. 20885986.8.

* cited by examiner

BATTERY BOX ARRANGEMENT

CROSS-REFERENCE TO RELATED APPLICATIONS

The present application claims priority from and is a U.S. National Phase of International Application No. PCT/SE2020/050981, which was filed on Oct. 15, 2020, designating the United States of America and claiming priority to Swedish Patent Application No. 1951270-6, filed on Nov. 6, 2019. This application claims priority to and the benefit of the above-identified applications, which are all fully incorporated by reference herein in their entireties.

TECHNICAL FIELD

The invention relates to a battery box arrangement for a vehicle according to the appended claims. The invention further relates to a vehicle with such a battery box arrangement according to the appended claims.

BACKGROUND

Vehicles, which are driven by electrical machines or a combination of electrical machines and a combustion engine, comprises energy storage units, such as electrical batteries. Depending on the type of vehicle, the need of electric power may vary. Heavy vehicles, such as trucks and busses, may need a number of batteries with large storage capacity of electric power in order to enable a sufficient operation range for the vehicles.

The batteries may have a substantial weight and they thus contribute to increasing the total weight of the vehicle. In addition, an assembly of a large number of batteries occupies volume in the vehicle.

Different types of vehicles have different space available for batteries between the front and rear wheel axles, depending on axle distance. It is therefore advantageous to have a battery suspension that can easily be adapted to different sizes of energy storage.

Document JP2018118673A discloses a battery support structure of vehicle, comprising a battery housing in which a battery is accommodated. A support frame with a support portion supports the battery housing on a vehicle frame.

SUMMARY

Heavy vehicles, such as trucks, often comprise a chassis frame, which has a flexibility for torsional loads. This is an advantage when it comes to mobility. A battery box with a stiff structure which accommodates batteries, which battery box is firmly mounted on the chassis frame, may influence the driving properties of the vehicle. In addition, the battery box structure also needs to manage the torsional and bending loads from the vehicle itself, which may result in a very strong and heavy battery box structure.

Since the need of electric power may vary depending of the type of vehicle, modularity by enabling different performance steps of electric battery sizes to a variation of propulsion and powertrain configurations with the same set of components would be advantageous.

Different types of vehicles have different available space for batteries between the front and rear wheel axles, depending on axle distance. It is therefore advantageous to have a battery suspension that can be easily adapted to different sizes of energy storage.

Batteries arranged between the front and rear wheel axles of a vehicle may be exposed to side forces due to accidents or collisions with other vehicles. Therefore, batteries arranged between the front and rear wheel axles of a vehicle should be protected from side impacts. However, impact or crash protection of batteries may further increase the weight of the vehicle.

Therefore, it is desired to arrange a battery box arrangement on a chassis frame of a vehicle and achieve satisfactory driving properties of the vehicle.

Further, it is desired to achieve a strong battery box arrangement structure with a low weight.

Further, it is desired to achieve a modular battery box arrangement, which enables different performance steps of electric battery sizes to a variation of propulsion and powertrain configurations of a vehicle.

Further, it is desired to achieve a battery box arrangement, which is adaptable for different sizes of batteries.

Further, it is desired to achieve a battery box arrangement, which protects batteries accommodated in the battery box from external forces.

An object of the invention is therefore to arrange a battery box arrangement on a chassis frame of a vehicle and achieve satisfactory driving properties of the vehicle.

A further object of the invention is to achieve a strong battery box arrangement structure with a low weight.

A further object of the invention is to achieve a modular battery box arrangement, which enables different performance steps of electric battery sizes to a variation of propulsion and powertrain configurations of a vehicle.

A further object of the invention is to achieve a battery box arrangement, which is adaptable for different sizes of batteries.

A further object of the invention is to achieve a battery box arrangement, which protects batteries accommodated in the battery box from external forces.

The herein mentioned objects are achieved with a battery box arrangement according to the appended claims. The herein mentioned objects are also achieved with a vehicle according to the appended claims.

According to an aspect of the invention, a battery box arrangement for a vehicle is provided. The battery box arrangement comprising a battery box configured to comprise at least one electric battery; at least one elongated beam element connected to the battery box; and at least one vibration damping element configured for connecting the at least one elongated beam element to a chassis frame of the vehicle; wherein the at least one elongated beam element is configured to extend transverse to the chassis frame of the vehicle; wherein a first end part of the at least one elongated beam element is connected to a first battery box module of the battery box, and wherein a second end part of the at least one elongated beam element is connected to a second battery box module of the battery box.

According to a further aspect of the invention, a vehicle is provided. The vehicle, comprising the battery box arrangement disclosed herein.

By such battery box arrangement and vehicle, satisfactory driving properties of the vehicle is achieved when arranging the battery box arrangement on the chassis frame of the vehicle. In addition, a strong battery box arrangement structure with a low weight is achieved. A modular battery box arrangement is achieved, which enables different performance steps of electric battery size to a variation of propulsion and powertrain configuration of the vehicle. Further, a battery box arrangement, which is adaptable for different sizes of batteries, and which protects batteries accommodated in the battery box from external forces is achieved.

Additional objectives, advantages and novel features of the invention will be apparent to one skilled in the art from the following details, and through exercising the invention. While the invention is described below, it should be apparent that the invention may not be limited to the specifically described details. One skilled in the art, having access to the teachings herein, will recognize additional applications, modifications and incorporations in other areas, which are within the scope of the invention.

BRIEF DESCRIPTION OF THE DRAWINGS

For fuller understanding of the present disclosure and further objects and advantages of it, the detailed description set out below should be read together with the accompanying drawings, in which the same reference notations denote similar items in the various figures, and in which.

DETAILED DESCRIPTION

Figure 1:
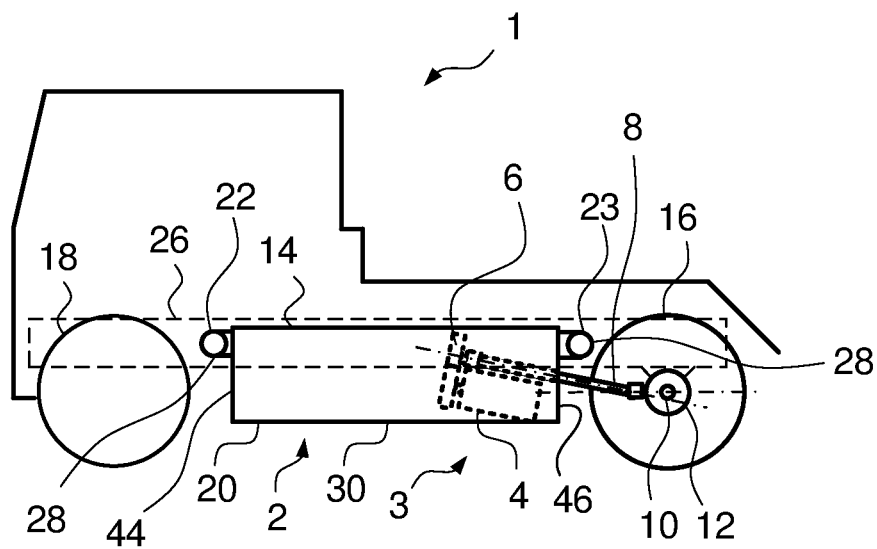
FIG. 1 schematically illustrates a side view of a vehicle with a battery box arrangement according to an example.

According to the present disclosure, a battery box arrangement for a vehicle is provided. The battery box arrangement comprising a battery box configured to comprise at least one electric battery; at least one elongated beam element connected to the battery box; and at least one vibration damping element configured for connecting the at least one elongated beam element to a chassis frame of the vehicle; wherein the at least one elongated beam element is configured to extend transverse to the chassis frame of the vehicle; wherein a first end part of the at least one elongated beam element is connected to a first battery box module of the battery box, and wherein a second end part of the at least one elongated beam element is connected to a second battery box module of the battery box.

The battery box arrangement according to the present disclosure ensures that satisfactory driving properties of the vehicle is achieved when arranging the battery box arrangement on the chassis frame of the vehicle. In addition, the battery box arrangement will have a strong structure with a low weight. The battery box arrangement may be modular, which enables different performance steps of electric battery size to a variation of propulsion and powertrain configuration of the vehicle. Further, the battery box arrangement will be adaptable for different sizes of batteries, and protect batteries accommodated in the battery box from external forces.

The battery box arrangement may have a shape adapted to the specific vehicle, which it is connected to. The shape of the battery box arrangement may be optimized to make use of any available volume in the vehicle. The shape of the battery box arrangement may have a design, which is aesthetic for the specific vehicle, which it is connected to.

The vehicle may driven by one or several electrical machines or a combination of electrical machines and another propulsion unit, such as a combustion engine. Depending on the type of vehicle, the need of electric power may vary. The battery box arrangement as described herein may be applicable on all sorts of land vehicles, such as road vehicles and off-road vehicles. Thus, the disclosure may relate to heavy vehicles, such as buses, trucks etc. Specifically, the present disclosure may relate to vehicles for use on public roads. Heavy vehicles may need a number of batteries with large storage capacity of electric power in order to enable a sufficient operation range for the vehicles.

The chassis frame may be any type of vehicle chassis frame. The chassis frame may comprise two frame beams, which are at least partly parallel and which are longitudinal arranged in the vehicle. Struts of cross bars may be arranged between the frame beams. The chassis frame may have a flexibility for torsional loads, which may be an advantage when it comes to mobility. The chassis frame may also have a flat framework structure. The chassis frame may be a flat plate with reinforcement ribs.

The battery box comprises wall elements, which may be vertically and horizontally arranged. The horizontally arranged walls may be bottom or floor elements of the battery box. The battery box may have a cuboid shape, the shape of a parallelepiped or any other shape, which is adapted to the shape of the batteries, which are to be accommodated in the battery box.

The elongated beam element has a tube shape or is a solid bar. The elongated beam element may be straight or may have a curved shape or a combination of a straight and curved shape. The at least one elongated beam element is configured to extend transverse to the chassis frame of the vehicle. When the at least one elongated beam element extend from one side to the other side of the vehicle, a bending and torque free connection between the at least one elongated beam element and the battery box is created. The closed cross-section between the transverse sides of the battery box arrangement transforms any bending load into a vertical load. The at least one elongated beam element may extend through, over or under the frame chassis from one side to the other side of the vehicle. The battery box may comprise a first and a second battery box module. The first and second battery box modules may be connected to first and second end parts of the at least one elongated beam element. The first end part of the at least one elongated beam element may be connected to the first battery box module of the battery box. The second end part of the at least one elongated beam element may be connected to a second battery box module of the battery box.

Since the elongated beam element has a tube shape or is a solid bar, stresses in the battery box is further reduced. Moreover, the elongated beam element may not depend on the mounting direction in the vehicle which leads to safe mounting without building in unfavourable prestresses. Furthermore, due to these features, a facilitated installation and mounting of the elongated beam element is provided. In addition, an elongated beam element is provided having conditions for being manufactured and assembled in a cost-efficient manner. The elongated beam element may be rotationally symmetrical and/or may comprise a circular cross-section.

The vibration damping element between the at least one elongated beam element and the chassis frame decouples the battery box from loads emanating from the frame and allows the frame to twist and bend independently from the battery box structure. Despite the resilient connection of the battery box by means of the at least one vibration damping element to the chassis frame, a high stability of the battery box arrangement can be ensured. Due to the resilient connection of the battery box by means of the at least one vibration damping element to the chassis frame, strong vibrations or shocks of the chassis frame are sufficiently mitigated to the battery box structure. Since the batteries may be sensitive to strong vibrations or shocks, the at least one vibration damping element will protect the batteries.

According to an example, the first battery box module is configured to be arranged on a first side of the chassis frame of the vehicle and the second battery box module is configured to be arranged on a second side of the chassis frame of the vehicle. The first and second battery box modules may be connected to first and second end parts of the at least one elongated beam element. Arranging the first and second battery box modules on each side of the chassis frame is advantageously since the space on each side of the chassis frame is used effectively. In addition, an equilibrium or balance between the the first and second battery box modules may be created when the chassis frame is positioned between the first and second battery box modules. Different types of vehicles have different space available for batteries between the wheel axles, depending on wheel axle distance in the longitudinal direction of the vehicle. The shape and size of the first and second battery box modules may easily be adapted to different sizes of available space between the wheel axles.

The at least one vibration damping element comprises a bushing, which at least in part embraces the at least one elongated beam element. The bushing may be introduced between the at least one elongated beam element and the chassis frame. The bushing may have resilient and damping characteristics. The bushing contributes to a suspension of the battery box, which decouples the battery box from any chassis frame loads such as twisting and bending. The bushing decouples the battery box from the chassis frame loads and allows the chassis frame to twist and bend independently from the battery box. The bushing may comprise rubber, or another type of resilient material. In embodiments in which the bushing comprises rubber, the bushing may be referred to as a rubber bushing.

Since the elongated beam element has a tube shape or is a solid bar and the at least one vibration damping element comprises a bushing, which at least in part embraces the at least one elongated beam element, a space-efficient solution is provided for forming a suspension of the battery box, which decouples the battery box from any chassis frame loads such as twisting and bending. Moreover, conditions are provided for using a low-cost circular bushing in a limited construction space. In addition, a battery box arrangement is provided in which a low transfer of stress is provided from the bushing to the elongated beam element.

According to an example, a third battery box module of the battery box is connected to the first and second battery box modules. In order to enable a sufficient operation range for the vehicle it is important to be able to provide a large amount of batteries in the battery box arrangement. For some applications, more or less the whole chassis frame between front and rear wheel axles may be filled with batteries in the battery box arrangement. The third battery box module together with the first and second battery box module will increase the modularity of the battery box arrangement, which enables different performance steps of electric battery sizes to a variation of propulsion and powertrain configurations of the vehicle. Since the first and second battery box modules are connected to the chassis frame, the third battery box module of the battery box may be connected directly to the first and second battery box modules and thus the third battery box module will benefit from the damping properties of the suspension of the battery box in the chassis via the first and second battery box modules.

According to an example, the third battery box module is configured to be arranged between two frame beams of the chassis frame of the vehicle. The chassis frame may comprise two frame beams, which are at least partly parallel and which are longitudinally arranged in the vehicle. The third battery box module may be arranged between the first and second battery box modules and also between the two frame beams of the chassis frame. If a propulsion unit or a gearbox of a powertrain is configured to be arranged between two frame beams of the chassis frame, it is possible to adapt the size of the third battery box module so that the powertrain components have enough space to be arranged between the two frame beams.

According to an example, at least one cross member is connected to the first and second battery box modules. The at least one cross member may extend in parallel with the at least one elongated beam element. The at least one cross member will together with the first and second battery box modules and the at least one elongated beam element create a strong and stiff battery box arrangement. The at least one cross member will together with the first and second battery box modules and the at least one elongated beam element create a torque free connection between the at least one elongated beam element and the battery box. The closed cross-section between the transverse sides of the battery box arrangement transforms any bending load acting on the chassis frame into a vertical load.

According to an example, the at least one cross member is via at least one vibration damping member configured to connect the first and second battery box module at one point to a strut of the chassis frame of the vehicle. The chassis frame may comprise two frame beams, which are at least partly parallel and which are longitudinal arranged in the vehicle. Struts of cross bars may be arranged between the frame beams. The struts connect the two frame beams. The struts may extend in a transvers direction in relation to the longitudinal direction of the two frame beams. The strut of the chassis frame of the vehicle may extend in a parallel direction in relation to the at least one cross member, which is connected to the first and second battery box modules. The battery box arrangement may in one end be provided with the at least one vibration damping member configured to connect the first and second battery box module at one point to a strut of the chassis frame, and in the other end be connected to the chassis frame by means of the elongated beam element.

According to an example, the at least one elongated beam element comprises a first elongated beam element and a second elongated beam element. The first and second elongated beam element will create a strong and stiff battery box arrangement.

The first and second elongated beam element will together stabilize the battery box arrangement.

According to an example, the first elongated beam element is connected to a first end wall of the first and second battery box module and wherein the second elongated beam element is connected to a second end wall of the of the first and second battery box module. The first end wall may have a surface facing the forward direction of the vehicle. The second end wall may have a surface facing the backward direction of the vehicle. The first and second elongated beam element will create a strong and stiff battery box arrangement when connecting the elongated beam elements in the first and second end walls of the of the first and second battery box modules. The first and second elongated beam element will together stabilize the battery box arrangement when connecting the elongated beam elements in the first and second end walls of the of the first and second battery box modules.

According to an example, impact absorbing wall elements are arranged on walls of the battery box. The impact absorbing wall elements may be integrated in the walls of the battery box. The impact absorbing wall elements may constitute the walls of the battery box. The walls of the battery box may also be the bottom or the floor of the battery box. Thus, the impact absorbing wall elements may be integrated in the bottom or the floor of the battery box. The impact absorbing wall elements may constitute the bottom or the floor of the battery box. The impact absorbing wall elements will carry and accommodate the batteries and protect them from impact. The impact absorbing wall elements may also enable a lighter battery box arrangement, since crash protection can be integrated in the walls of the battery box.

According to an example, bulkheads are arranged in the battery box. Creating the battery box in sections, with transverse bulkheads in combination with impact absorbing wall elements arranged on the walls of the battery box, enables an integrated crash structure of the battery box arrangement. Force from a side impact on the impact absorbing wall elements may be transferred to the bulkheads, which together with the impact absorbing wall elements will protect the batteries in the battery box by resisting deformation of the battery box. The bulkheads may also create natural interfaces for different lengths or sizes of the batteries. Depending on the needed amount of batteries, the bulkheads may create partition walls between the batteries in the battery box.

According to an example, impact protecting pads are arranged between the battery box and the chassis frame. An impact on the battery box in a direction from one side of the battery box may move the battery box in the direction of the chassis frame.

The impact protecting pads, which are arranged between the battery box and the chassis frame will absorb energy from the impact and thus protect both the battery box and the chassis frame.

According to an example, the battery box is configured to comprise at least one fuel tank. In case the vehicle may driven by a combination of electrical machines and another propulsion unit, such as a combustion engine, the battery box may comprise at least one electric battery and at least one fuel tank, such as a diesel tank. In case the vehicle comprises auxiliary equipment, such hydraulic actuators or hydraulic motors, the battery box may also comprise a hydraulic oil tank.

Further, according to the present disclosure, a vehicle is provided. The vehicle, comprises the battery box arrangement disclosed herein. The vehicle may driven by one or several electrical machines or a combination of electrical machines and another propulsion unit, such as a combustion engine. Depending on the type of vehicle, the need of electric power may vary. The battery box arrangement as described herein may be applicable to all sorts of land vehicles, such as road vehicles and off-road vehicles. Thus, the disclosure may relate to heavy vehicles, such as buses, trucks etc. Specifically, the present disclosure may relate to vehicles for use on public roads. Heavy vehicles may need a number of batteries with large storage capacity of electric power in order to enable a sufficient operation range for the vehicles. The battery box arrangement may have a shape adapted to the specific vehicle, which it is connected to. The shape of the battery box arrangement may be optimized to make use of any available volume in the vehicle. The shape of the battery box arrangement may have a design, which is aesthetic for the specific vehicle, which it is connected to.

The present disclosure will now, according to an example, be further illustrated with reference to the appended figures.

Figure 2:
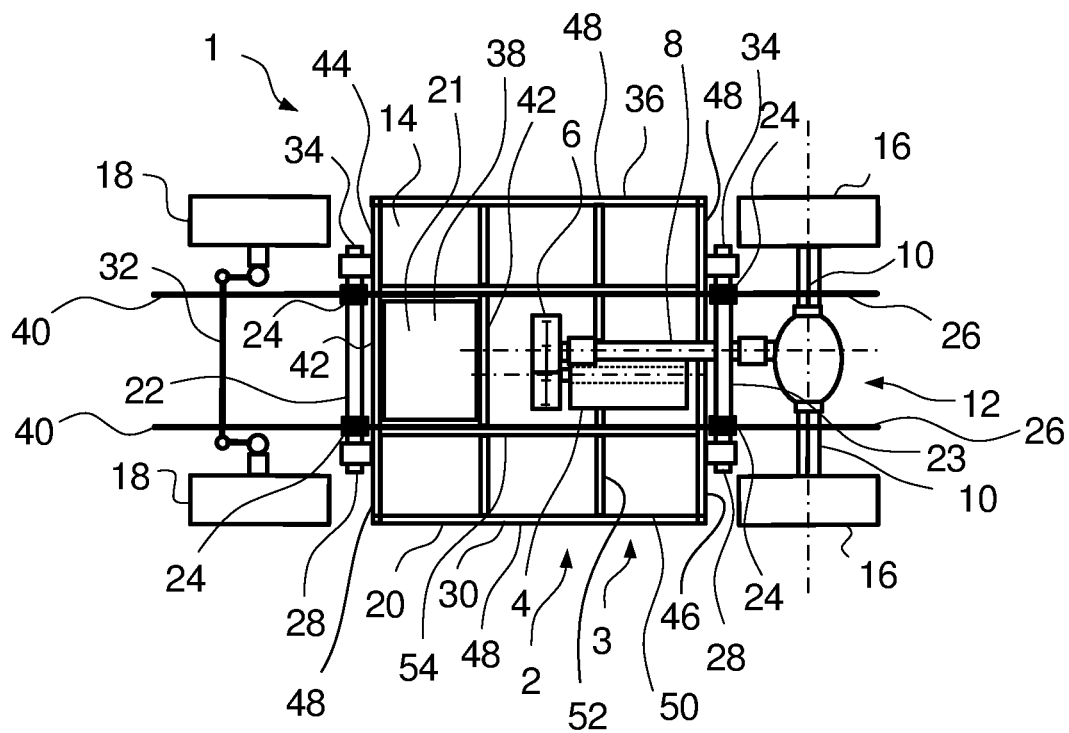
FIG. 2 schematically illustrates a view from above of a vehicle with a battery box arrangement according to an example.

FIGS. 1 and 2 schematically illustrate a side view and a view from above of a vehicle 1 with a battery box arrangement 2 according to an example. The vehicle 1 is provided with a powertrain 3 comprising a propulsion unit 4, a transmission 6 connected to the propulsion unit 4 and a propeller shaft 8 connected to the transmission 6, and at least one drive shaft 10 of a rear axle 12. The at least one drive shaft 10 is connected to the propeller shaft 8, so that the propeller shaft 8 extends between the transmission 6 and the at least one drive shaft 10. The propulsion unit 4 is arranged in a position between the transmission 6 and the rear axle 12 in a longitudinal direction of the vehicle 1. The vehicle is provided with a front axle 32 and front wheels 18 connected to the front axle 32. The vehicle is provided with drive wheels 16 connected to the rear axle 12. The vehicle 1 comprises a chassis frame 26.

The battery box arrangement 2 comprising a battery box 20, which is configured to comprise at least one energy storage unit 14, such as electric batteries 14. A first elongated beam element 22 and a second elongated beam element 23 are connected to the battery box 20. Vibration damping elements 24 are configured for connecting the elongated beam elements 22, 23 to the chassis frame 26 of the vehicle 1. The elongated beam elements 22, 23 are configured to extend transverse to the chassis frame 26 of the vehicle 1. A first end part 28 of each elongated beam element 22, 23 is connected to a first battery box module 30 of the battery box 20. A second end part 34 of each elongated beam element 22, 23 is connected to a second battery box module 36 of the battery box 20. The first elongated beam element 22 is connected to a first end wall 44 of the first and second battery box module 30, 36 and wherein the second elongated beam element 23 is connected to a second end wall 46 of the of the first and second battery box module 30, 36.

The batteries 14 are connected to the propulsion unit 4 and deliver electric power to the propulsion unit 4. A number of propulsion units 4 may be arranged in series. The propulsion unit 4 may be an electrical machine 4.

The first battery box module 30 is configured to be arranged on a first side of the chassis frame 26 and the second battery box module 36 is configured to be arranged on a second side of the chassis frame 26.

A third battery box module 38 of the battery box 20 is connected to the first and second battery box modules 30, 36. The third battery box module 38 is configured to be arranged between two frame beams 40 of the chassis frame 26. At least one cross member 42 is connected to the first and second battery box modules 30, 36.

Impact absorbing wall elements 48 are arranged on walls 50 of the battery box 20 and bulkheads 52 are arranged in the battery box 20. Impact protecting pads 54 are arranged between the battery box 20 and the chassis frame 26.

In case the vehicle may driven by a combination of electrical machines and another propulsion unit, such as a combustion engine, the battery box 20 may comprise at least one electric battery 14 and at least one fuel tank 21, such as a diesel tank.

Figure 3:
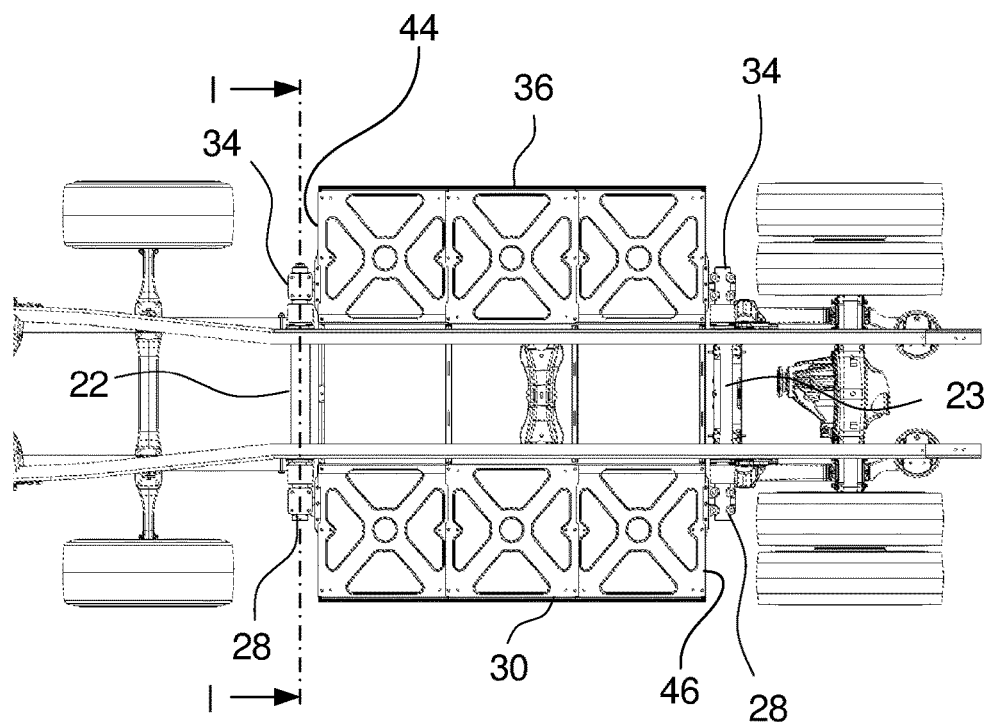
FIG. 3 schematically illustrates a view from above of a vehicle with a battery box arrangement according to an example.

FIG. 3 schematically illustrates a view from above of a vehicle with a battery box arrangement according to an example. The first end part 28 of each elongated beam element 22, 23 is connected to the first battery box module 30 of the battery box 20. The second end part 34 of each elongated beam element 22, 23 is connected to the second battery box module 36 of the battery box 20. The first elongated beam element 22 is connected to the first end wall 44 of the first and second battery box module 30, 36 and the second elongated beam element 23 is connected to the second end wall 46 of the of the first and second battery box module 30, 36.

Figure 4:
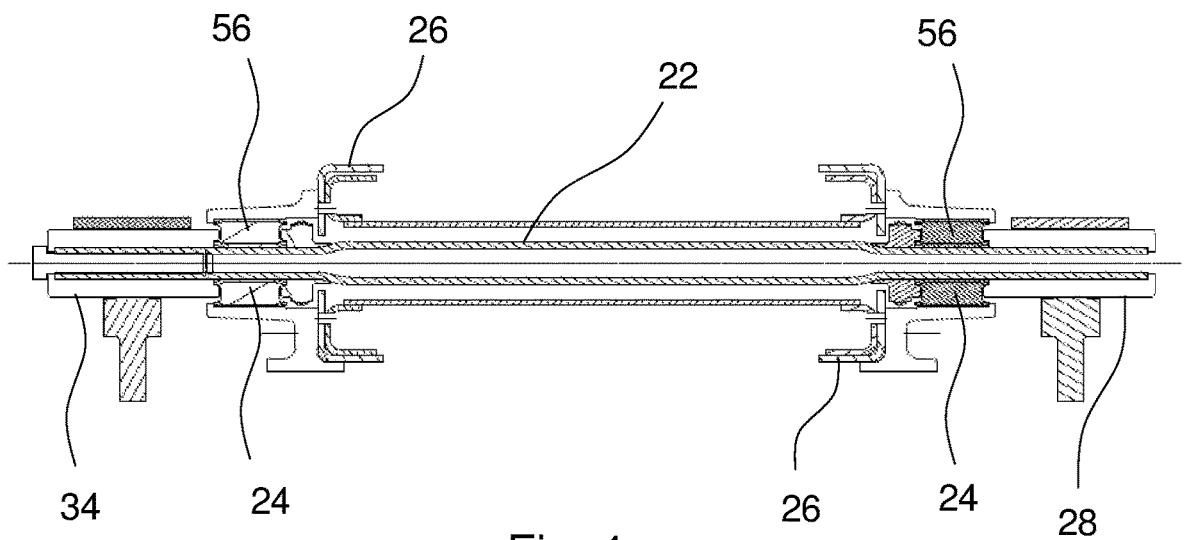
FIG. 4 illustrates a section view through line I-I in FIG. 3 of an elongated beam element connected of the battery box arrangement.

FIG. 4 illustrates a section view through line I-I in FIG. 3 of the first elongated beam element 22 connected of the battery box arrangement 2. The vibration damping elements 24 comprises a bushing 56, which at least in part embraces the first elongated beam element 22. The first elongated beam element 22 passes through the chassis frame 26. The first elongated beam element 22 is connected to the chassis frame 26 by means of the bushing 56.

Figure 5:
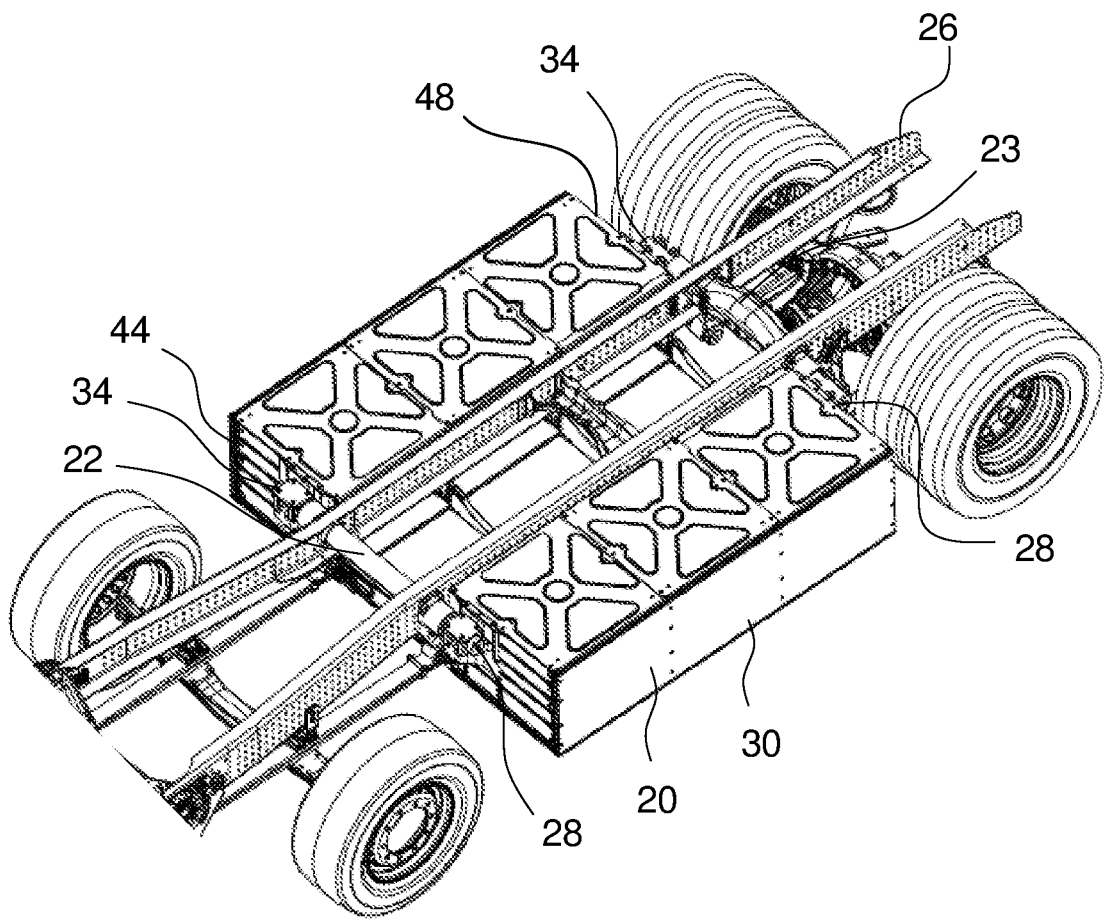
FIG. 5 schematically illustrates a view in perspective of a vehicle with a battery box arrangement according to an example.

FIG. 5 schematically illustrates a view in perspective of a vehicle with a battery box arrangement according to an example. The first end part 28 of each elongated beam element 22, 23 is connected to the first battery box module 30 of the battery box 20. The second end part 34 of each elongated beam element 22, 23 is connected to the second battery box module 36 of the battery box 20. The first elongated beam element 22 is connected to the first end wall 44 of the first and second battery box module 30, 36 and the second elongated beam element 23 is connected to the second end wall 46 of the of the first and second battery box module 30, 36. The first and second elongated beam elements 22, 23 passes through the chassis frame 26.

Figure 6:
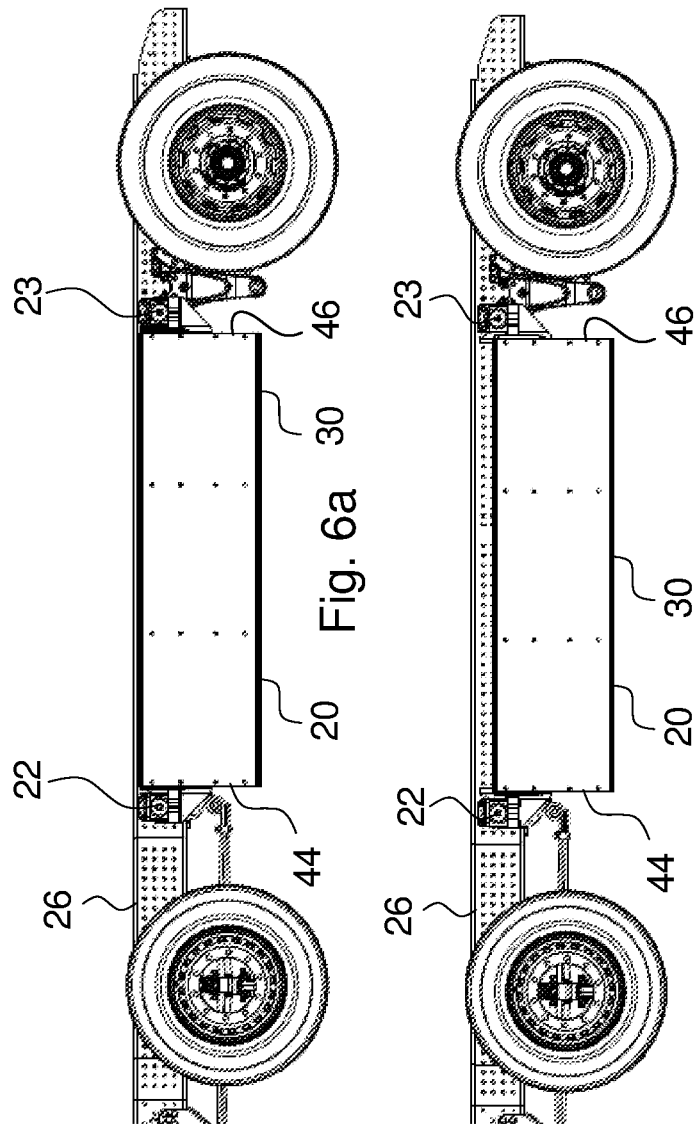
FIGS. 6a-6b schematically illustrate side views of a vehicle with a battery box arrangement according to an example.

FIGS. 6a-6b schematically illustrate side views of a vehicle with a battery box arrangement according to an example. The first elongated beam element 22 is connected to the first end wall 44 of the first and second battery box module 30, 36 and the second elongated beam element 23 is connected to the second end wall 46 of the of the first and second battery box module 30, 36. In FIG. 6a, the first and second elongated beam elements 22, 23 are connected to the middle of the first and second end walls 44, 46. Such configuration will create a small distance between the upper part of the chassis frame 26 and the lowermost part of the battery box 20. In FIG. 6b, the first and second elongated beam elements 22, 23 are connected to an upper part of the first and second end walls 44, 46. Such configuration will create an increased distance between the upper part of the chassis frame 26 and the lowermost part of the battery box 20.

Figure 7:
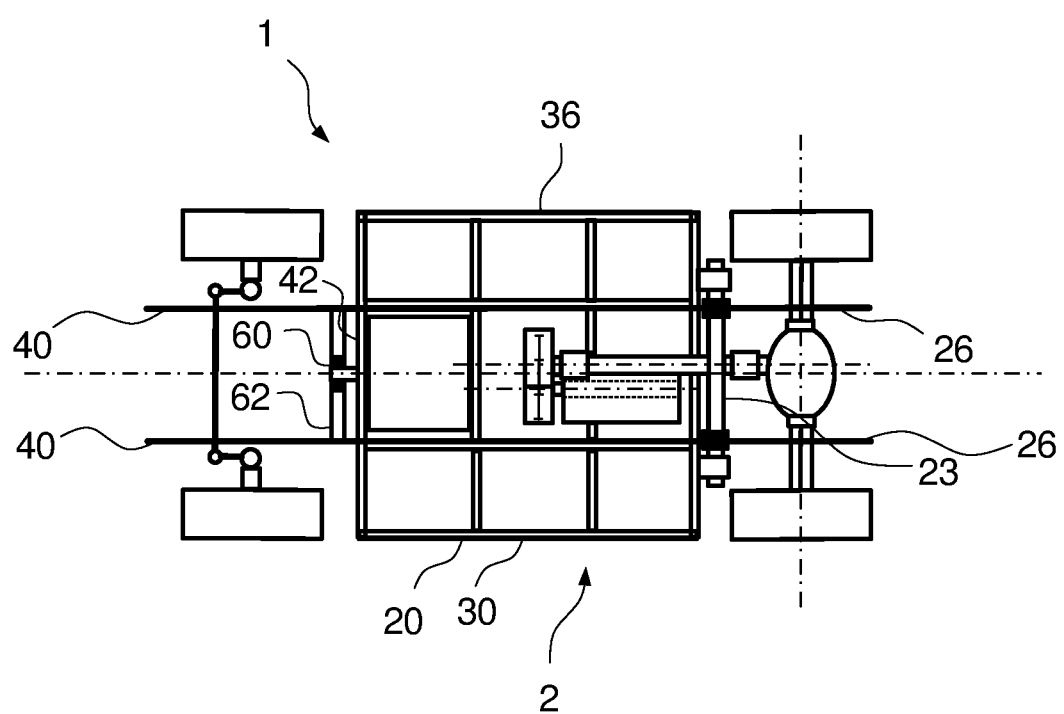
FIG. 7 schematically illustrates a view from above of a vehicle with a battery box arrangement according to an example.

FIG. 7 schematically illustrates a view from above of a vehicle 1 with a battery box arrangement 2 according to an example. One cross member 42 is via a vibration damping member 60 configured to connect the first and second battery box module 30, 36 at one point to a strut 62 of the chassis frame 26 of the vehicle 1. The chassis frame 26 may comprise two frame beams 40, which are parallel and which are longitudinal arranged in the vehicle 1. The strut 62 or cross bar is arranged between the frame beams 40. The strut 62 connects the two frame beams 40. The strut 62 extends in a transvers direction in relation to the longitudinal direction of the two frame beams 40. The strut 62 extends in a parallel direction in relation to the cross member 42, which is connected to the first and second battery box modules 30, 36. The battery box arrangement 2 comprises in one end the vibration damping member 60, which is configured to connect the first and second battery box module 30, 36 at one point to the strut 62 of the chassis frame 26. In the other end the first and second battery box modules 30, 36 are connected to the chassis frame 26 by means of the second elongated beam element 23. The battery box 20 will in this configuration be connected to the chassis frame 26 in three points.

The foregoing description of the examples has been furnished for illustrative and descriptive purposes. It is not intended to be exhaustive, or to limit the examples to the variants described. Many modifications and variations will obviously be apparent to one skilled in the art. The examples have been chosen and described in order to best explicate principles and practical applications, and to thereby enable one skilled in the art to understand the examples in terms of its various examples and with the various modifications that are applicable to its intended use. The components and features specified above may, within the framework of the examples, be combined between different examples specified.

The invention claimed is:

1. A battery box arrangement for a vehicle, the battery box arrangement comprising:
   a battery box configured to comprise at least one electric battery;
   at least one elongated beam element connected to the battery box; and
   at least one vibration damping element configured for connecting the at least one elongated beam element to a chassis frame of the vehicle;
   wherein the at least one elongated beam element is configured to extend transverse to the chassis frame of the vehicle;
   wherein a first end part of the at least one elongated beam element is connected to a first battery box module of the battery box, and
   wherein a second end part of the at least one elongated beam element is connected to a second battery box module of the battery box, and
   characterized in that the at least one elongated beam element has a tube shape or is a solid bar, and wherein the at least one vibration damping element comprises a bushing, which at least in part embraces the at least one elongated beam element.

2. The battery box arrangement according to claim 1, wherein the first battery box module is configured to be arranged on a first side of the chassis frame of the vehicle and the second battery box module is configured to be arranged on a second side of the chassis frame of the vehicle.

3. The battery box arrangement according to claim 1, wherein a third battery box module of the battery box is connected to the first and second battery box modules.

4. The battery box arrangement according to claim 3, wherein the third battery box module is configured to be arranged between two frame beams of the chassis frame of the vehicle.

5. The battery box arrangement according to claim 1, wherein at least one cross member is connected to the first and second battery box modules.

6. The battery box arrangement according to claim 5, wherein the at least one cross member is connected via at least one vibration damping member configured to connect the first and second battery box modules at one point to a strut of the chassis frame of the vehicle.

7. The battery box arrangement according to claim 1, wherein the at least one elongated beam element comprises a first elongated beam element and a second elongated beam element.

8. The battery box arrangement according to claim 7, wherein the first elongated beam element is connected to a first end wall of the first and second battery box modules and wherein the second elongated beam element is connected to a second end wall of the first and second battery box modules.

9. The battery box arrangement according to claim 1, wherein impact absorbing wall elements are arranged on walls of the battery box.

10. The battery box arrangement according to claim 1, wherein bulkheads are arranged in the battery box.

11. The battery box arrangement according to claim 1, wherein impact protecting pads are arranged between the battery box and the chassis frame.

12. The battery box arrangement according to claim 1, wherein the battery box is configured to comprise at least one fuel tank.

13. A vehicle, comprising a battery box arrangement according to claim 1.

* * * * *

UNITED STATES PATENT AND TRADEMARK OFFICE
CERTIFICATE OF CORRECTION

Page 1 of 1

| | |
|---|---|
| PATENT NO. | : 12,070,996 B2 |
| APPLICATION NO. | : 17/773170 |
| DATED | : August 27, 2024 |
| INVENTOR(S) | : Kvaldén et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 256 days.

Signed and Sealed this
Third Day of December, 2024

Katherine Kelly Vidal
*Director of the United States Patent and Trademark Office*